United States Patent [19]

Withrow

[11] Patent Number: 4,934,423
[45] Date of Patent: Jun. 19, 1990

[54] EXTENSION TABLE FOR WORK TABLES

[76] Inventor: John Withrow, 87 Hammond Drive, Aurora, Ontario, Canada, L4G 2T8

[21] Appl. No.: 400,058

[22] Filed: Aug. 29, 1989

Related U.S. Application Data

[63] Continuation-in-part of Ser. No. 218,250, Jul. 13, 1988, abandoned.

[51] Int. Cl.⁵ .............................................. B27B 25/10
[52] U.S. Cl. ................................ 144/286 R; 144/287; 83/435.1; 83/437; 83/477.2; 83/468.3; 83/701; 83/859
[58] Field of Search ................... 83/435.1, 477.2, 437, 83/438, 473, 468.3, 701, 859; 144/287, 286 R, 286 A; 108/65, 69, 71

[56] References Cited

U.S. PATENT DOCUMENTS

| | | | |
|---|---|---|---|
| 141,975 | 8/1873 | Xander | 83/435.1 |
| 981,431 | 1/1911 | Knights | 144/286 R |
| 2,555,217 | 5/1951 | Young | 144/286 R |
| 3,429,347 | 2/1969 | Klein | 83/435.1 |
| 4,068,551 | 1/1978 | Kreitz | 83/471.3 |
| 4,133,237 | 1/1979 | Lewin | 83/477.24 |
| 4,221,246 | 9/1980 | Grutter | 83/435.1 X |
| 4,248,115 | 2/1981 | Brodbeck et al. | 83/435.1 |
| 4,406,200 | 9/1983 | Kerr | 83/473 |
| 4,408,509 | 10/1983 | Winchip | 83/435.1 |
| 4,546,804 | 10/1985 | Haeger | 144/287 X |

*Primary Examiner*—Frank T. Yost
*Assistant Examiner*—Eugenia A. Jones
*Attorney, Agent, or Firm*—Blake, Cassels & Graydon

[57] ABSTRACT

An extension table for work tables such as a circular saw table, in combination therewith. The extension table provides a flat surface with a support frame for attachment to commercially available tables. The support frame is preferably connected to the work table work surface by means of "U"-channel member connected to the side of work surface. The "U"-channel has inwardly directed lips. There is an insert inside the channel connected to a flange of the remaining support frame, the flange and insert bearing against either side of the lips. The height of the flange is adjustable during installation so as to afford a flush alignment of the extension and work table surfaces.

6 Claims, 3 Drawing Sheets

EXTENSION TABLE FOR WORK TABLES

RELATED APPLICATION

This application is a continuation-in-part of application Ser. No. 07/218,250 filed July 13, 1988, now abandoned.

BACKGROUND OF THE INVENTION

1. Field of the Invention

This invention relates to extension tables for work tables such as tables such as saw tables and combinations of saw tables with such extension tables.

2. Background of the Invention

Table saws have become important useful tools to both the professional carpenter and to the amateur. A table saw comprises a saw table having a saw blade projecting through a substantially rectangular, flat, horizontal work surface. Frequently the saw blade may project at different angles through the work surface as in tilting arbor table saws. The mechanism and motors for operating the saw are usually housed in a cabinet beneath the work surface. The work surface itself is often not greatly larger than the top of the cabinet.

For domestic and home use the overall size of such table saws including the size of the working surface tends to be small both for economic reasons and to make the device as portable as possible for the home user. Even the table saws designed for professional use do not have particularly large work surfaces.

The work surfaces provided are usually sufficient for cutting operations involving a large variety of shapes and sizes of work piece. However, when very large panels or very long work pieces are used, they extend off the work surface and may tend to bend or tilt away from the work surface. For this reason, various extensions have been suggested for saw tables.

Commercially available power saw tables are provided with wings which are generally bolted or otherwise conventionally fastened to the table. According to certain aspects of this invention, the wing fastening means provided as part of the saw table may be used to fasten the extension thereto.

One simple extension table is disclosed in U.S. Pat. No. 4,068,551 issued to Kreitz in January, 1978. This extension table comprises a hinged flap attached to the work surface of the table saw. The flap may be hinged up into operating Position and supported in that position by legs at an end of the flap remote from the table saw. When not required the legs may be folded against the flap and the flap may be hinged downwardly to lie against the side of the table saw support. This extension table gives good support for long work pieces which are to be cut at right angles to their length by the saw. However, no provision is made for moving the extension table to accommodate work pieces which are to be cut at a substantial angle to the saw blade. Another known extension device is disclosed in U.S. Pat. No. 2,722,243 issued to Nagy in May, 1954 which comprises two rollers supported by cantilevered extension bars from the saw table. This device is shown in position to support long work pieces which are to be cut longitudinally. There is no indication of any means to move the device to accommodate work pieces at an angle to the saw blade or even at right angles to the saw blade so that they may be cut across their length.

U.S Pat. No. 3,429,347 issued to Klein in February 1969 discloses an extension device of adjustable length and adjustable position. The device comprises a frame which may be attached at different attachment points around the periphery of the saw table. The frame may be extended by adding additional frame members. The end of the frame remote from the saw table is supported on the ground by legs. Although this extension is movable to different positions around the table saw, there is no continuous sliding movement for fine adjustment.

U.S. Pat. No. 4,248,115 issued to Brodbeck et al in Feburary, 1981 discloses an extension table for tilting arbor table saws. This extension is supported flush with the work surface of the saw table at one end to slide on a guide rail parallel with the plane of the saw blade. At the end of the extension table remote from the saw blade, the extension table is supported by an arm pivoted to the saw blade and pivoted to the extension table so that sliding motion along the guide rails is permitted. This extension table represents a considerable advance over those of Nagy, Kreitz and Klein in that the extension table may be easily slid into different positions to support work pieces presented to the saw at different angles, however, the mechanism by which this slidability is accomplished requires the use of the pivot arm secured to the stand of the table saw at a specifically selected point and through a specifically selected mechanism to provide for appropriate height of the extension table and slidability in both directions. The range of the sliding motion is limited by the geometry of the pivot arm.

While Brodbeck's device may be applied to different saw tables, it is not possible to use it with a saw table which is not provided with means to accommodate the pivot arm. Thus tables saw which are not provided with such means must be specially adapted for use with the Brodbeck extension table.

BRIEF SUMMARY OF THE INVENTION

It was the aim of the present applicant to devise an extension for a table, especially a table for use with long work pieces, such as saw tables, tables for shapers and like carpenters' tables. It was aimed to avoid the necessity of special fixing points on the saw table but provide continuous adjustment of the position of the extension to allow for presentation of large work pieces at various angles.

Thus, the invention provides, in combination, a work table, such as a saw table having a cutting blade projecting through a substantially rectangular, flat, a horizontal work surface, and an extension to one side of the work surface, the extension comprising: a horizontal, flat extension surface to be located to one side of the work table having an edge adapted to be aligned with said side of the work surface;

a support frame therefor attached to the work surface through a horizontal member adjacent the work table, the height of the horizontal member being adjustable through height adjustment means whereby the extension surface is locatable flush with work surface;

guide rails fixed on one of the extension surface or the support frame to be parallel to each other and to said side of the work surface, the guide rails having an unobstructed length adapted to extend in each direction, the other of the extension surface or the support being slidable on the guide rails; and height adjustment means for the support frame.

Suitably the extension surface is provided with an adjustably positionable guide for a work piece and clamp means for retaining the work piece in fixed relation to the guide and the extension surface for any cutting operation. Suitably two guide rails are provided. At least one of these may be fixed on the support frame and the extension surface may slide on them. This arrangement may be more stable than the case where the guide rails are fixed on the extension surface and slide on the support frame. In either case the guide rails may be connected at their ends to form a rectangular frame. This avoids the unguarded ends of the guide rails projecting from the extension table to constitute a safety hazard. Moreover, the parallel relationship of the guide rails may be safeguarded.

Although it is possible to provide a support frame with four legs each of which is provided with height adjustment means to either level the extension table or to adjust its height to that of different saw tables, it is preferred to provide the support frame with one or more and preferrably two legs remote from the saw table. When the support frame is thus provided with support legs remote from the saw table, it may be connected to the saw table through load bearing securing means, whereby the saw table itself acts as part of the support for the extension table. Such load bearing securing means needs no special adaption of the saw table. For example, the support frame may be secured to the saw table by screws or by nuts and bolts or any other convenient means. It may be convenient to secure the support frame to the saw table even when it has four supporting legs.

DETAILED DESCRIPTION OF PREFERRED EMBODIMENTS OF THE INVENTION

An embodiment of the invention will now be described by way of example with reference to the accompanying drawings in which.

Figure 1:
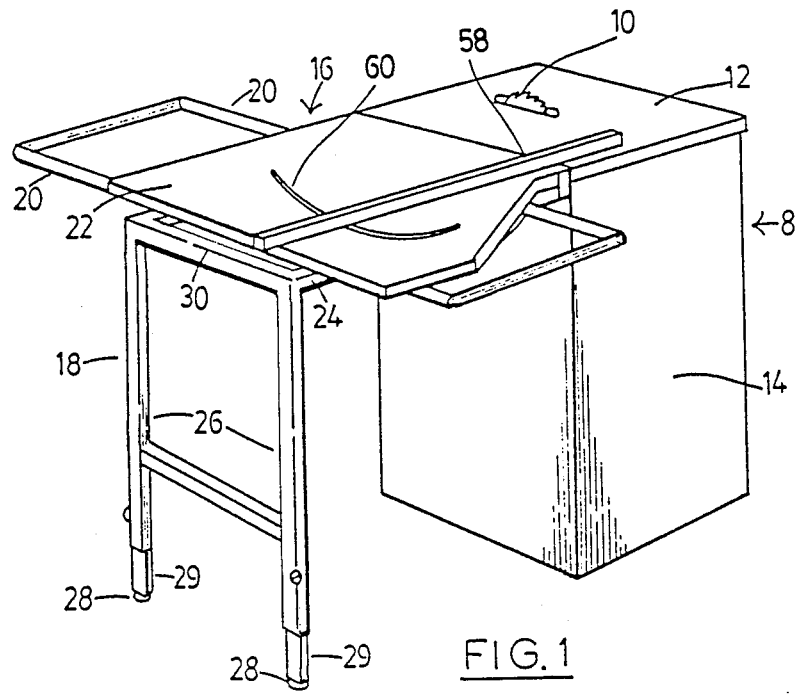
FIG. 1 is a perspective sketch of a combination of an extension according to the invention in combination with a table saw.
Figure 3:
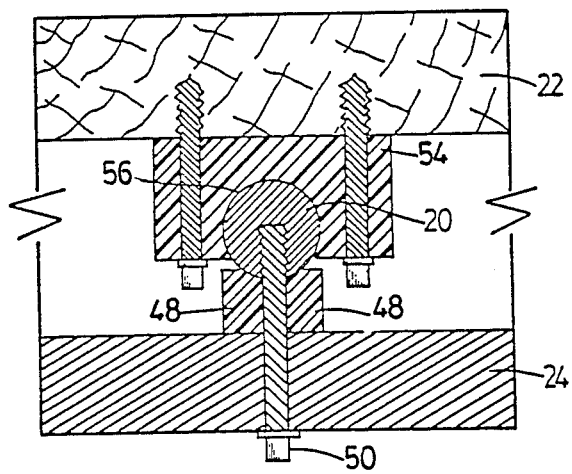
FIG. 3 shows a detail of the sliding mechanism.
Figure 2:
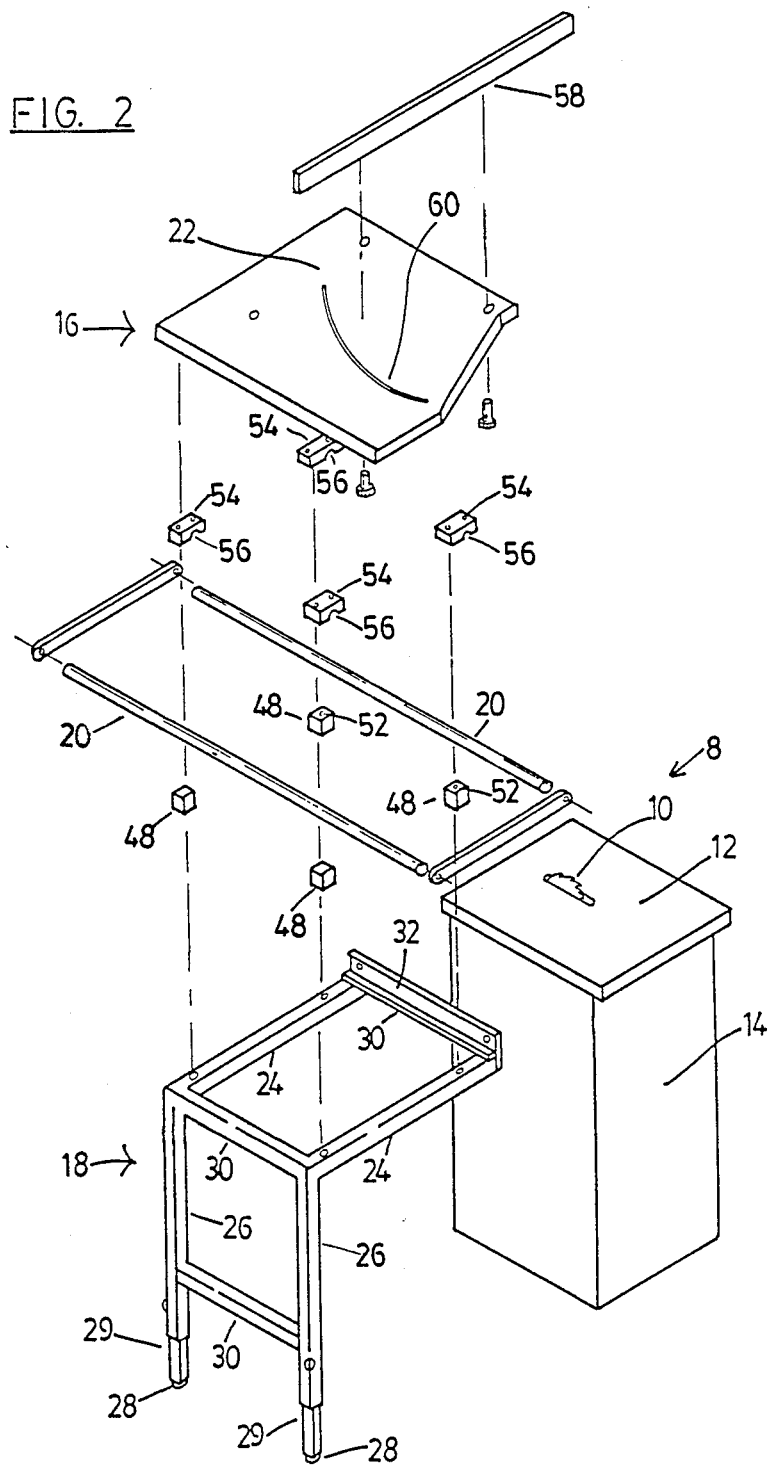
FIG. 2 is an exploded view of the combination of FIG. 1.

Referring to the drawings, a table saw 8 is shown, which may be of any conventional design but usually will comprise a saw blade 10 projecting through a work surface 12 mounted on a cabinet 14 housing mechanical parts.

An extension 16 comprises a frame 18, guide rails 20 connected at their ends and an extension surface 22.

The frame 18 comprises a rectangular horizontal part formed by a pair of parallel support rails 24 to support the guide rails 20 to extend beyond either end of work surface 12 as shown, and a pair of connecting rails 30. At least one end of the pair of support rails 24 is provided with a pair of legs 26. The height of each leg 26 is adjustable by means of levellers 28 and telescopic joints 29. A further pair of legs (not shown) may be provided for the support rails 24 so that the frame may form a stable, free-standing structure. However, as illustrated, a single pair of legs 26 is Provided and the other end of the pair of support rails is secured through an upstanding flange 32 of the respective connecting rail 30 to the work surface 12. The height of the flange 32 is such as to locate the support rails 24 sufficiently lower than the work surface 12 that, when guide rails 20 and extension surface are located thereon, the adjacent edge of the extension surface is level with the work surface.

Figure 4:
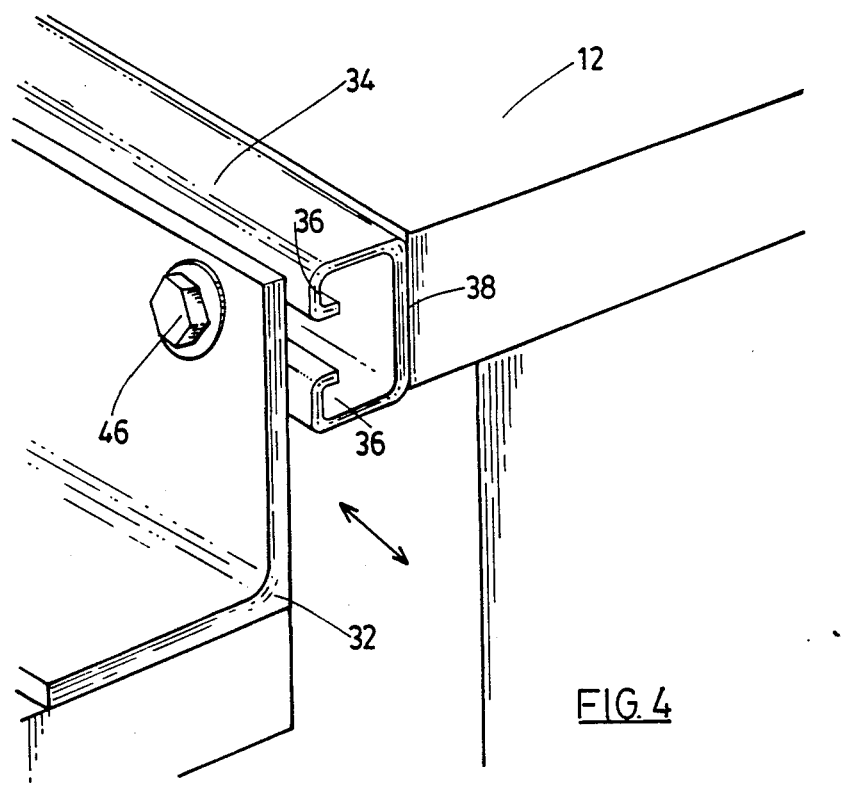
FIG. 4 is a detail perspective view of a preferred embodiment of this invention.
Figure 5:
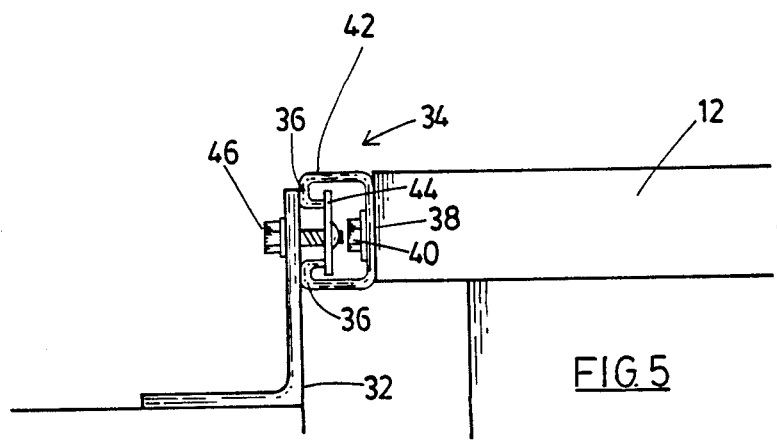
FIG. 5 is a plan end view of the detail of FIG. 4.

Flange 32 is illustrated in detail as part of the preferred embodiment of this invention in FIGS. 4 and 5. Flange 32 may be connected, by choice of the installer, using one of at least two methods. Accordingly, U-channel 34 provided with lips 36, is bolted to the depending side 38 of table top 12. A commercial saw may be provided with a suitably located wing bolted to the depending side 38 (not illustrated). In such case, the wing may be removed and the holes in side 38 used as guides to drill holes into the bottom of U-channel 34 to provide communicating apertures through which may pass respective bolts 40 for fastening of the U-channel to the side. Alternatively U-channel 34 is provided with holes which are used as guides to drill holes into depending side 38. In either case, holes are drilled in place so that the bottom of the outer U-channel directly abuts the depending side and the side of U-channel 42 is flush with work surface 12. A power drill would generally be used for drilling the holes. Insert 44, provided with threaded holes, is located within the U-channel 34 and flange 32, provided with corresponding holes located to communicate with the threaded holes of the insert is held in position by the use of two or more screws 46, threaded to engage the threaded holes of the insert.

The foregoing arrangement permits the installer to adjust the extension table so that its work surface is flush with that of the table saw. During installation, screws 46 are installed so that insert 44 is in place loosely within U-channel 34 this arrangement permitting the jockeying of the insert within the channel so that flange 32 may be moved into place such that the work surface of extension 16, connected to the flange is flush with work surface 12. Once everything is in the desired location, screws 46 are tightened to secure the extension to the table. The "U"-channel, insert, screws and flange thus comprise a height adjustment means whereby the surface of the extension is locatable flush with the work surface of the table.

The main adjusters may be telescopic joints 29 by means of which parts of each leg may be telescoped with respect to each other. When a suitable height of leg is achieved, the leg parts may be locked in position by any suitable means. Finer adjustment may be by levellers 28 acting to level the height of the frame at the end of the support rails 24 remote from the work surface so that the edge of the extension surface remote from the work surface may also be levelled with it. The levellers 28 may be of any suitable type, for example, finger adjustable screw levellers in which a nut is adjustable on a screw threaded vertical bolt in order to raise or lower the leg with respect thereto. Levellers 28 and joints 29 are important both in adjusting the height of the frame and hence of the extension surface so that it can be made flush with work surfaces of widely varying heights, and also for levelling the frame when the floor level is uneven.

The guide rails 20 are conveniently cylindrical tubes or rods, preferably rods located horizontally on the support rails at right angles thereto on bearing blocks 48. The blocks 48 are conveniently made of plastics material such as nylon, polypropylene or an acetal resin, for example DELRIN (Trade Mark). Each of these blocks 48 may be secured to a support rail 24. Securement may be, for example by screws or bolts 50 extending through apertures 52 in the support rails and into blocks 48.

The top surfaces of the blocks 48 are bearing surfaces for the guide rails 20 and may be conformed to the shape of the guide rails so that each guide rail tends to nest into a block 48. The guide rails 20 may rest freely on the blocks 48 or at least one may be fixed with respect thereto. When they are fixed, it may be convenient to extend the screws or bolts 50 through the blocks 48 to extend into screw threaded aperatured in guide rails 20. It is not necessary that the screws or bolts 50 extend into both guide rails since, if the guide rails are connected at their ends, fixing one guide rail with respect to the support frame, will also locate the other.

The extension surface 16 is provided on its lowerside with slide blocks 54 each having a slide channel 56 in its lower part conformed to fit onto a guide rail 20 and to allow sliding of the guide rail 20 in the channel 56. The slide blocks 54 may be formed of any suitable material having sufficiently low friction with respect to the guide rails 20 to permit sliding. Nylon, polypropylene or an acetal resin, for example DELRIN (Trade Mark) is suitable.

To minimize friction between the slide blocks 54 and the guide rails 20, two spaced apart slide blocks 54 having very short channels 56 may be provided for each guide rail 20 as shown. The slide blocks 54 should be sufficiently spaced apart to support extension surface 16 on the guide rails 20 without any tendency to tip when upward or downward force is exerted unevenly on it. Alternatively, a single elongate guide block 54 having an elongate channel may be provided for each guide rail 20.

Channel 56 of each slide block 54 preferably extends slightly more than half-way around the guide rail 20 so that it is possible to snap the slide blocks 54 into engagement with their respective guide rails 20. Preferably, the guide rail 20 may be disengaged from the channel 56 by appropriate manual force.

The extension surface 22 may be provided with various workpiece handling means, such as fence 58, to locate the workpiece. The fence 58, may be positionable by a key running in slot 60. Clamp means (not shown) may be provided to clamp the fence in position and additional clamp means (also not shown) may clamp the work in relation to the fence.

In setting up an extension as described, the height of the legs may be roughly adjusted such that the extension surface will be level with the work surface of the saw table. The upstanding flange 32 is secured to the work surface. Guide rails 20 are located on blocks 48 and at least one of them may be secured to the respective blocks. Extension surface 22 having slide blocks 54 on its under surface is then snapped into position onto the guide rails. Fine adjustment of the height of legs 26 may now be made by levellers 28, if required.

In operating the table saw using the extension, the fence 58 is positioned as desired and a work piece is clamped to it. The extension surface may then be slid on the guide rails 20 to continuously present the work piece to the sawblade 10.

Although a specific arrangement of guide rails has been described, various other arrangements are possible within the scope of the invention. For example, the blocks 48 secured to guide rails 20 may be carried by the extension surface 22 and the slide blocks 54 may be carried by the support rails 24. Other shapes of guide rails are possible. Thus guide rails keying into corresponding slide channels may be used. Alternatively, guide rails of various sections may cooperate with corresponding channels without keying. The guide rails may, themselves be provided with channels accepting runners located on the underside of the extension surface or on the frame.

What is claimed is:

1. An extension in combination with a work table having a flat work surface and a straight depending side wherein the extension comprises:
    a flat extension surface having a straight edge;
    a support frame attached to the work surface through a horizontal member adjacent the depending side and the straight edge, the height of the horizontal member being adjustable through height adjustment means whereby the flat extension surface is locatable flush with the flat work surface;
    two guide rails fixed to the support frame to be parallel to each other and to said side of the work surface, the guide rails having an unobstructed length longer than the side of the work table and extending in each direction beyond ends of the work table, the extension surface being slidable on the guide rails; in which the horizontal member comprises:
    a "U"-channel having lips inwardly directed of the channel and having its bottom connected to the depending side;
    an insert located within the "U"-channel shaped and dimensioned to abut inner sides of the lips; and
    an L-shaped flange having a vertical arm and a horizontal arm wherein the vertical arm of the flange and the insert are connected such that the vertical arm and insert abut outer and inner surfaces of the lips respectively and the horizontal arm is directed away from the depending side as part of the support frame.

2. The combination as claimed in claim 1, in which the guide rails are connected at their ends to form a rectangular frame.

3. The combination as claimed in claim 2 in which the support frame is provided with a pair of legs remote from the saw table, each of the legs having height adjustment means.

4. The combination as claimed in claim 1, in which each guide rail is a rod of circular cross section and is located to slide in correspondingly channelled guide blocks secured on an under side of the extension surface.

5. The combination as claimed in claim 1, in which each guide block is formed of plastics material having the channel embracing a major portion of the circumference of the respective guide rail, the guide rail being releasable from its channel by resilient deformation of the respective block.

6. The combination of claim 1, wherein the height adjustment means comprises vertical legs wherein each leg comprises two longitudinal members connected by a telescopic joint whereby the length of the leg may be adjusted.

* * * * *